US010635251B2

(12) United States Patent
Shi

(10) Patent No.: US 10,635,251 B2
(45) Date of Patent: Apr. 28, 2020

(54) TOUCH PANEL AND TOUCH DEVICE

(71) Applicant: Wuhan China Star Optoelectronics Semiconductor Display Technology Co., Ltd., Wuhan, Hubei (CN)

(72) Inventor: Wenjie Shi, Guangdong (CN)

(73) Assignee: WUHAN CHINA STAR OPTOELECTRONICS SEMICONDUCTOR DISPLAY TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/084,926

(22) PCT Filed: Jul. 5, 2018

(86) PCT No.: PCT/CN2018/094655
§ 371 (c)(1),
(2) Date: Sep. 13, 2018

(87) PCT Pub. No.: WO2019/227593
PCT Pub. Date: Dec. 5, 2019

(65) Prior Publication Data
US 2019/0369766 A1    Dec. 5, 2019

(30) Foreign Application Priority Data

May 30, 2018   (CN) .......................... 2018 1 0537607

(51) Int. Cl.
*G06F 3/044* (2006.01)
*G06F 3/041* (2006.01)
(52) U.S. Cl.
CPC ............ *G06F 3/044* (2013.01); *G06F 3/0412* (2013.01)

(58) Field of Classification Search
CPC ...... G06F 3/044; G06F 3/0412; G06F 3/0445; G06F 3/0446; G06F 3/041; G06F 2203/04103
See application file for complete search history.

(56) References Cited

U.S. PATENT DOCUMENTS 8,269,743 B2 *   9/2012   Kuo ........................ G06F 3/044
                                                 345/173
8,698,768 B2 *   4/2014   Lee ........................ G06F 3/044
                                                 345/173

(Continued)

FOREIGN PATENT DOCUMENTS

CN         103293726 A      9/2013
CN         103293779 A      9/2013

(Continued)

OTHER PUBLICATIONS

International search report dated Feb. 27, 2019 from corresponding application No. PCT/CN2018/094655.

*Primary Examiner* — Sardis F Azongha
(74) *Attorney, Agent, or Firm* — Leong C. Lei

(57) ABSTRACT

The invention provides a touch panel and a touch device. The touch panel comprises: a substrate; a plurality of first electrode chains and second electrode chains on the substrate, disposed in a repeated and cross-insulating manner; the first electrode chain comprising a plurality of first electrodes, and the second electrode chain comprising a plurality of second electrodes; wherein the first electrode comprising a first sub-electrode and a second sub-electrode, electrically connected to each other, the first sub-electrode and the second sub-electrode being disposed spaced apart, and the second electrode surrounding both the first sub-electrode and the second sub-electrode. The touch panel of the invention provides higher touch detection accuracy.

20 Claims, 4 Drawing Sheets

(56) References Cited

U.S. PATENT DOCUMENTS

| | | | |
|---|---|---|---|
| 2010/0045614 A1* | 2/2010 | Gray | G06F 3/044 345/173 |
| 2012/0127387 A1* | 5/2012 | Yamato | G06F 3/044 349/42 |
| 2014/0253499 A1* | 9/2014 | Lee | G06F 3/044 345/174 |
| 2015/0287381 A1* | 10/2015 | Kim | G06F 3/044 345/174 |
| 2015/0324027 A1* | 11/2015 | Heo | C12N 15/8261 345/173 |
| 2016/0048239 A1* | 2/2016 | Zheng | G06F 3/0412 345/174 |
| 2016/0291725 A1* | 10/2016 | Zhai | G06F 3/044 |
| 2017/0371470 A1 | 12/2017 | Nathan | |
| 2018/0329555 A1* | 11/2018 | Kim | G09G 3/3208 |

FOREIGN PATENT DOCUMENTS

| | | |
|---|---|---|
| CN | 104199586 A | 12/2014 |
| CN | 104898892 A | 9/2015 |

\* cited by examiner

TOUCH PANEL AND TOUCH DEVICE

CROSS REFERENCE TO RELATED APPLICATIONS

This application is a National Phase of International Application Number PCT/CN2018/094655, filed Jul. 5, 2018, and claims the priority of Chinese Patent Application No. CN201810537607.1, entitled "Touch Panel and Touch Device", filed on May 30, 2018, the disclosure of which is incorporated herein by reference in its entirety.

BACKGROUND OF THE INVENTION

1. Field of the Invention

The present invention relates to the field of touch function, and in particular to the field of touch panel and touch device.

2. The Related Arts

With the development of display technology, the organic light-emitting diode (OLED) panels have been adopted by more and more electronic products, and flexible OLEDs have attracted much attention due to the flexibility thereof. The touch sensor used in the flexible OLED panel is mainly an external type, that is, the touch sensor module is completed on the thin film encapsulation layer and then attached to the OLED panel. A problem faced by the direct fabrication of a touch sensor on a flexible OLED panel is the interference of the electron emission layer (i.e., the cathode) of the OLED on the touch sensor signal. Since the thickness of the thin film encapsulation material is only ten-plus micrometers, which leads to too close the distance between the touch sensor and the cathode, and the cathode electric field affects the driving signal of the touch sensor, thereby reducing the node capacitance, and resulting in low detection accuracy

SUMMARY OF THE INVENTION

A touch panel, which comprises:
a substrate;
a plurality of first electrode chains and second electrode chains on the substrate, disposed in a repeated and cross-insulating manner;
the first electrode chain comprising a plurality of first electrodes, and the second electrode chain comprising a plurality of second electrodes;
wherein the first electrode comprising a first sub-electrode and a second sub-electrode, electrically connected to each other, the first sub-electrode and the second sub-electrode being disposed spaced apart, and the second electrode surrounding both the first sub-electrode and the second sub-electrode.

The touch device provided by the present technical solution comprises: a substrate; a plurality of first electrode chains and second electrode chains on the substrate, disposed in a repeated and cross-insulating manner; the first electrode chain comprising a plurality of first electrodes, and the second electrode chain comprising a plurality of second electrodes; wherein the first electrode comprising a first sub-electrode and a second sub-electrode, electrically connected to each other, the first sub-electrode and the second sub-electrode being disposed spaced apart, and the second electrode surrounding both the first sub-electrode and the second sub-electrode. Since the first electrode comprises a first sub-electrode and a second sub-electrode that are electrically connected, the first sub-electrode and the second sub-electrode are spaced apart, the second electrode surrounds both the first sub-electrode and the second sub-electrode, therefore, the first sub-electrode and the second sub-electrode span at least a part of the surface of the second electrode, thereby increasing the length of the mutual boundary between the first electrode and the second electrode, thereby increasing the number The mutual capacitance between the first electrode and the second electrode, which further enables the touch panel to provide higher touch detection accuracy.

The present invention also provides a touch device. The touch device comprises the above touch panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects, and are not intended to describe a particular order.

Figure 1:
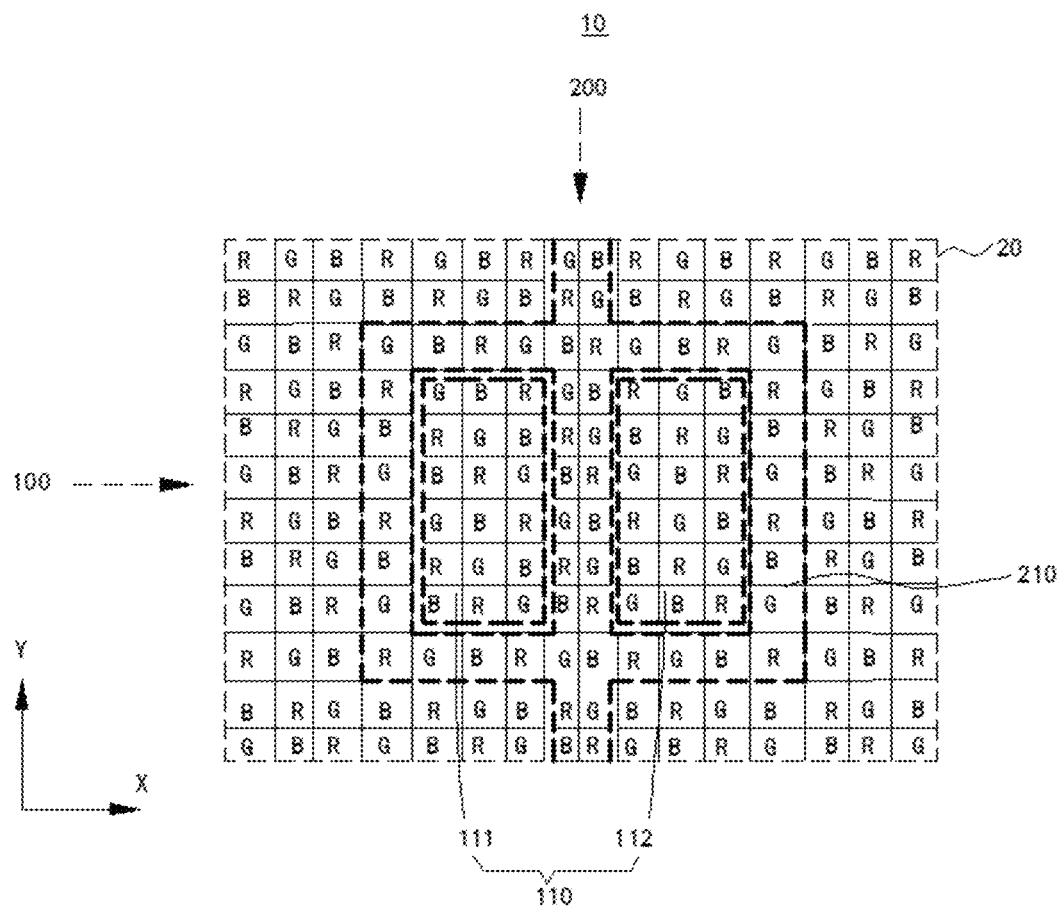
FIG. 1 is a schematic view showing the structure of the touch panel according to the first embodiment of the present invention.

As shown in FIG. 1, FIG. 1 is a schematic view showing the structure of the touch panel according to the first embodiment of the present invention. The touch panel 10 comprises:

a substrate 20;

a plurality of first electrode chains 100 and second electrode chains 200 on the substrate 20, disposed in a repeated and cross-insulating manner;

the first electrode chain 100 comprising a plurality of first electrodes 110, and the second electrode chain 200 comprising a plurality of second electrodes 210;

wherein the first electrode 110 comprising a first sub-electrode 111 and a second sub-electrode 112, electrically connected to each other, the first sub-electrode 111 and the second sub-electrode 112 being disposed spaced apart, and the second electrode 210 surrounding both the first sub-electrode 111 and the second sub-electrode 112.

Wherein, the substrate 20 is a transparent substrate, such as, a glass substrate or a plastic substrate, and may be a flexible substrate. When the touch panel is applied to an OLED display device, the substrate may be an encapsulation layer of the OLED display device.

Optionally, in an embodiment, the first electrode chain 100 is a sensing electrode chain, and the second electrode chain 200 is a driving electrode chain. It should be understood that in other embodiments, the first electrode chain 100 is a driving electrode chain, and the second electrode chain 200 is a sensing electrode chain. In the present application, the first electrode chain 100 is a sensing electrode chain, and the second electrode chain 200 is a driving electrode chain.

Optionally, in an embodiment, the second electrode 210 is a shape of a square with a bar penetrating the middle section of the square (which resembles the Chinese character of middle), and the first electrode 110 is a "1" shape. The second electrode 210 and the first electrode 110 form a circular nested structure.

Specifically, the first electrode chain 100 comprises a plurality of first electrodes 110, and the second electrode chain 200 comprises a plurality of second electrodes 210. The first electrode chain 100 and the second electrode chain 200 together form the touch panel 10. The touch panel 10 is only a minimum unit. In actual applications, the touch panel 10 is the smallest unit for extending in a first direction and a second direction. The first direction may be the X direction or the Y direction, and the second direction may be the Y direction or the X direction. When the first direction is the X direction, the second direction is the Y direction; when the first direction is the Y direction, the second direction is the X direction. In the present application, the first direction is the X direction, and the second direction is the Y direction.

It should be noted that, in actual use, the first electrode chain 100 and the second electrode chain 200 must avoid red, green and blue (RGB) pixel points of the touch panel 10, and the first electrode chain 100 and the second electrode chain 200 may be disposed at gap areas between the RGB pixel points such that the wiring of the first electrode chain 100 and the second electrode chain 200 can avoid RGB pixels points. Because the first electrode chain 100 and the second electrode chain 200 are made of a metal material, which may block the light emission of the RGB pixel points, therefore, the first electrode chain 100 and the second electrode chain 200 are disposed in the RGB pixel area to prevent the first electrode chain 100 and the second electrode chain 200 from shielding the light emission of the RGB element points.

The touch panel provided by the present technical solution comprises: a substrate; a plurality of first electrode chains and second electrode chains on the substrate, disposed in a repeated and cross-insulating manner; the first electrode chain comprising a plurality of first electrodes, and the second electrode chain comprising a plurality of second electrodes; wherein the first electrode comprising a first sub-electrode and a second sub-electrode, electrically connected to each other, the first sub-electrode and the second sub-electrode being disposed spaced apart, and the second electrode surrounding both the first sub-electrode and the second sub-electrode. Since the first electrode comprises a first sub-electrode and a second sub-electrode that are electrically connected, the first sub-electrode and the second sub-electrode are spaced apart, the second electrode surrounds both the first sub-electrode and the second sub-electrode, therefore, the first sub-electrode and the second sub-electrode span at least a part of the surface of the second electrode, thereby increasing the length of the mutual boundary between the first electrode and the second electrode, thereby increasing the number The mutual capacitance between the first electrode and the second electrode, which further enables the touch panel to provide higher touch detection accuracy.

Figure 2:
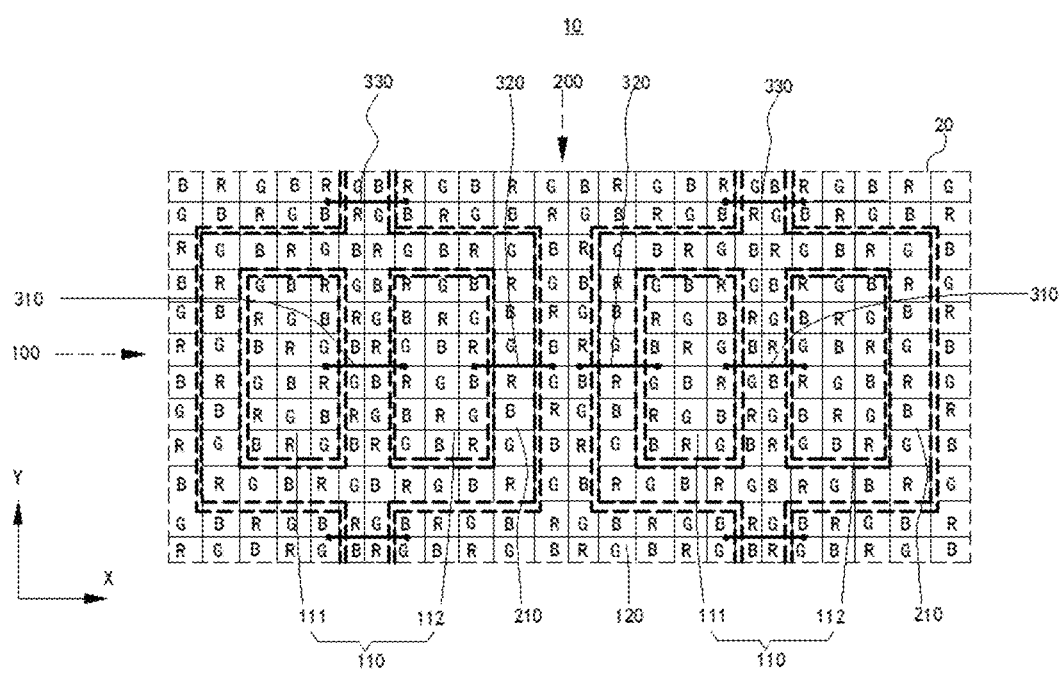
FIG. 2 is a schematic view showing the structure of the touch panel according to the second embodiment of the present invention.

Optionally, refer to FIG. 2. FIG. 2 is a schematic view showing the structure of the touch panel according to the second embodiment of the present invention. The second embodiment differs from the first embodiment in that the touch panel 10 of the present invention further comprises:

a third electrode 120, disposed between two adjacent second electrodes 210 and insulated from the second electrode 210;

a first connecting portion 310, electrically connecting the first sub-electrodes 111 to the adjacent second sub-electrodes 112;

wherein, the first connecting portion 310 being made of a metal material.

Optionally, in an embodiment, the number of the first connecting portions 310 may be one or plural.

A second connecting portion 320 is electrically connecting the first electrode 110 to the adjacent third electrode 120.

A third connecting portion 330 is electrically connecting two adjacent third electrodes 120.

Optionally, in an embodiment, the number of the second connecting portions 320 may be one. It may be understood that in other embodiments, the number of the second connecting portions 320 may also be plural. It may be understood that the number of the second connecting portions 330 may be one or plural.

Optionally, in an embodiment, the number of the first sub-electrodes 111 may be one. It may be understood that in other embodiments, the number of the first sub-electrodes 111 may also be plural.

Optionally, in an embodiment, the number of the second sub-electrodes 112 may be one. It may be understood that in other embodiments, the number of the second sub-electrodes 112 may also be plural.

Figure 3:
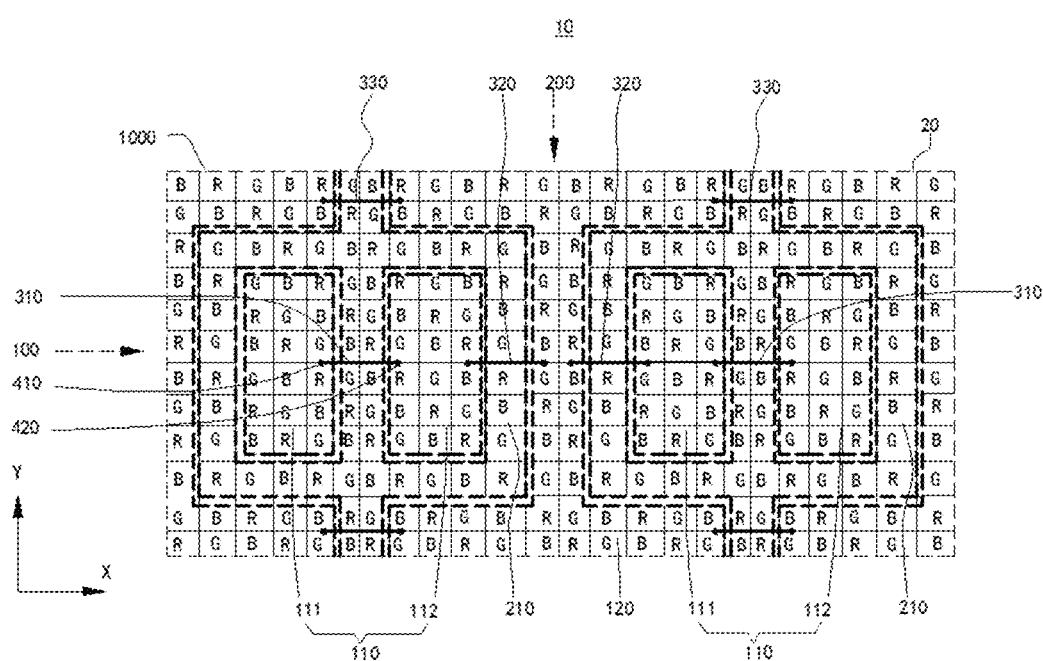
FIG. 3 is a schematic view showing the structure of the touch panel according to the third embodiment of the present invention.

Optionally, refer to FIG. 3. In an embodiment, the first electrode 110 and the second electrode 210 are disposed in the same layer, and an insulating layer 1000 is disposed between the first connecting portion 310 and the first sub-electrode 111 and the second sub-electrodes 112. The insulating layer 1000 is disposed with a first via 410 corresponding to the first sub-electrode 111, and the insulating layer 1000 is disposed with a second via 420 corresponding to the second sub-electrode 112. The first connecting portion 310 is electrically connected to the first sub-electrode 111 through the first via 410, and the first connecting portion 310 is electrically connected to the second sub-electrode 112 through the second via 420.

Optionally, a metal material is disposed inside the first via 410 and the second via 420.

Optionally, in another embodiment, the first electrode 110 and the second electrode 210 are disposed in different layers, and the first connecting portion 310 and the first electrode 110 are disposed in the same layer.

Optionally, in yet another embodiment, a barrier layer is disposed between the first electrode 110 and the second electrode 210, and the barrier layer is configured to isolate the first electrode 110 and the second electrode 210.

The touch panel provided by the present technical solution comprises: a substrate; a plurality of first electrode chains and second electrode chains on the substrate, disposed in a repeated and cross-insulating manner; the first electrode chain comprising a plurality of first electrodes, and the second electrode chain comprising a plurality of second electrodes; wherein the first electrode comprising a first sub-electrode and a second sub-electrode, electrically connected to each other, the first sub-electrode and the second sub-electrode being disposed spaced apart, and the second electrode surrounding both the first sub-electrode and the second sub-electrode. Since the first electrode comprises a first sub-electrode and a second sub-electrode that are electrically connected, the first sub-electrode and the second sub-electrode are spaced apart, the second electrode surrounds both the first sub-electrode and the second sub-electrode, therefore, the first sub-electrode and the second sub-electrode span at least a part of the surface of the second electrode, thereby increasing the length of the mutual boundary between the first electrode and the second electrode, thereby increasing the number The mutual capacitance between the first electrode and the second electrode, which further enables the touch panel to provide higher touch detection accuracy.

Figure 4:
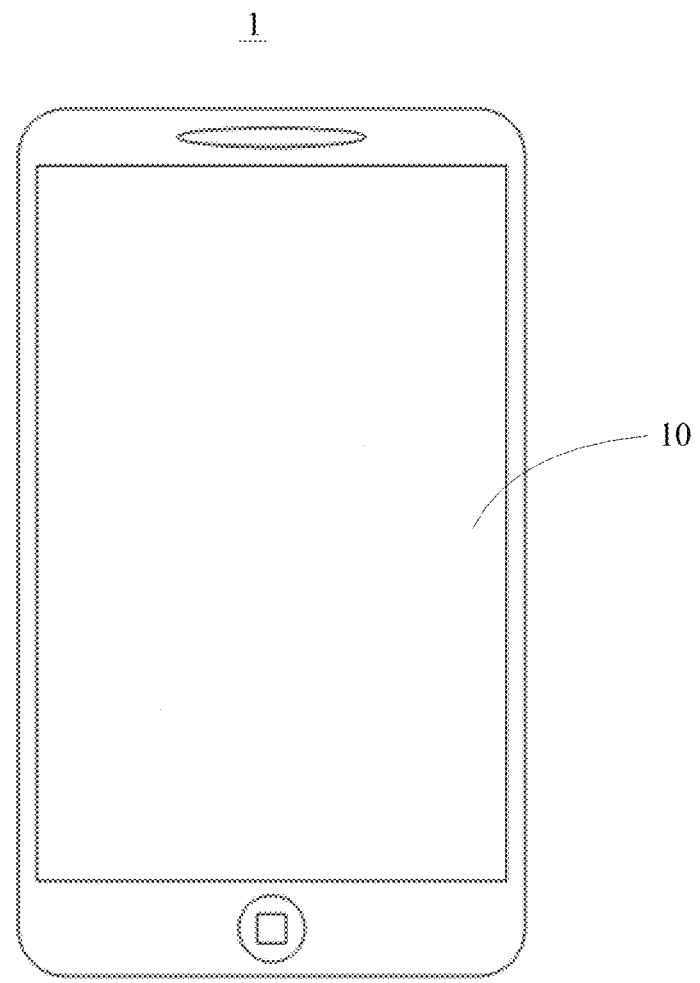
FIG. 4 is a schematic view showing the structure of the touch device according to a preferred embodiment of the present invention.

Refer to FIG. 4. FIG. 4 is a schematic view showing the structure of the touch device according to a preferred embodiment of the present invention. The touch device 1 comprises a touch panel 10, and the touch panel 10 may be the touch panel 10 provided in any of the preceding embodiments, and details are not described herein. The touch device 1 can be, but is not limited to, an e-book, a smart phone (such as an Android phone, an IOS phone, a Windows Phone, etc.), a tablet, a palmtop computer, a notebook computer, and a mobile Internet device (Mobile Internet Devices, MID) or wearable devices. The touch device can be an OLED touch device.

It should be noted that each of the embodiments in this specification is described in a progressive manner, each of which is primarily described in connection with other embodiments with emphasis on the difference parts, and the same or similar parts may be seen from each other. For the device embodiment, since it is substantially similar to the method embodiment, the description is relatively simple and the relevant description may be described in part of the method embodiment.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A touch panel, comprising:
   a substrate;
   a plurality of first electrode chains and second electrode chains on the substrate, disposed in a repeated and cross-insulating manner;
   the first electrode chain comprising a plurality of first electrodes, and the second electrode chain comprising a plurality of second electrodes;
   wherein the first electrode comprises a first sub-electrode and a second sub-electrode, electrically connected to each other, the first sub-electrode and the second sub-electrode being disposed spaced apart, and the second electrode comprising an enclosing frame completely surrounding and circumferentially enclosing both the first sub-electrode and the second sub-electrode and a separating strip separating the first sub-electrode and second sub-electrode from each other.

2. The touch panel as claimed in claim 1, further comprising: a first connecting portion, electrically connecting the first sub-electrode to the adjacent second sub-electrode.

3. The touch panel as claimed in claim 2, wherein the first electrode and the second electrode are disposed in the same layer, and an insulating layer is disposed between the first connecting portion and the first sub-electrode and the second sub-electrodes; the insulating layer is disposed with a first via corresponding to the first sub-electrode, and the insulating layer is disposed with a second via corresponding to the second sub-electrode; the first connecting portion is electrically connected to the first sub-electrode through the first via, and the first connecting portion is electrically connected to the second sub-electrode through the second via.

4. The touch panel as claimed in claim 3, wherein a metal material is disposed inside the first via and the second via.

5. The touch panel as claimed in claim 2, wherein the first electrode and the second electrode are disposed in different layers, and the first connecting portion and the first electrode are disposed in the same layer.

6. The touch panel as claimed in claim 1, wherein the first electrode chain further comprises: a third electrode, disposed between two adjacent second electrodes, and being insulated from the second electrodes.

7. The touch panel as claimed in claim 6, further comprising: a second connecting portion, electrically connecting the first electrode to the adjacent third electrode.

8. The touch panel as claimed in claim 6, further comprising: a third connecting portion, electrically connecting two adjacent third electrodes.

9. The touch panel as claimed in claim 1, wherein the first electrode chain is a sensing electrode chain and the second electrode chain is a driving electrode chain.

10. The touch panel as claimed in claim 1, wherein the first electrode chain is a driving electrode chain and the second electrode chain is a sensing electrode chain.

11. A touch device, comprising a touch panel, wherein the touch panel comprises:
    a substrate;
    a plurality of first electrode chains and second electrode chains on the substrate, disposed in a repeated and cross-insulating manner;
    the first electrode chain comprising a plurality of first electrodes, and the second electrode chain comprising a plurality of second electrodes;
    wherein the first electrode comprises a first sub-electrode and a second sub-electrode, electrically connected to each other, the first sub-electrode and the second sub-electrode being disposed spaced apart, and the second electrode comprising an enclosing frame completely surrounding and circumferentially enclosing both the first sub-electrode and the second sub-electrode and a separating strip separating the first sub-electrode and second sub-electrode from each other.

12. The ouch device as claimed in claim 11, wherein the touch panel further comprises: a first connecting portion, electrically connecting the first sub-electrode to the adjacent second sub-electrode.

13. The touch device as claimed in claim 12, wherein the first electrode and the second electrode are disposed in the same layer, and an insulating layer is disposed between the first connecting portion and the first sub-electrode and the second sub-electrodes; the insulating layer is disposed with a first via corresponding to the first sub-electrode, and the insulating layer is disposed with a second via corresponding to the second sub-electrode; the first connecting portion is electrically connected to the first sub-electrode through the first via, and the first connecting portion is electrically connected to the second sub-electrode through the second via.

14. The touch device as claimed in claim 13, wherein a metal material is disposed inside the first via and the second via.

15. The touch device as claimed in claim 12, wherein the first electrode and the second electrode are disposed in different layers, and the first connecting portion and the first electrode are disposed in the same layer.

16. The touch device as claimed in claim 11, wherein the first electrode chain further comprises: a third electrode, disposed between two adjacent second electrodes, and being insulated from the second electrodes.

17. The touch device as claimed in claim 16, wherein the touch panel further comprises: a second connecting portion, electrically connecting the first electrode to the adjacent third electrode.

18. The touch device as claimed in claim 16, wherein the touch panel further comprises: a third connecting portion, electrically connecting two adjacent third electrodes.

19. The touch device as claimed in claim 11, wherein the first electrode chain is a sensing electrode chain and the second electrode chain is a driving electrode chain.

20. The touch device as claimed in claim 11, wherein the first electrode chain is a driving electrode chain and the second electrode chain is a sensing electrode chain.

* * * * *